United States Patent [19]

Suzuki

[11] 4,323,289
[45] Apr. 6, 1982

[54] ROLLER BEARING HAVING A FORCIBLE LUBRICATION FUNCTION

[75] Inventor: Toshio Suzuki, Chigasaki, Japan

[73] Assignee: Nippon Seiko Kabushiki Kaisha, Tokyo, Japan

[21] Appl. No.: 143,006

[22] Filed: Apr. 23, 1980

[30] Foreign Application Priority Data

Nov. 15, 1979 [JP] Japan ............................ 54-141436[U]

[51] Int. Cl.³ ............................................. F16C 19/49
[52] U.S. Cl. ................................ 308/202; 308/207 R; 308/36.4
[58] Field of Search ............... 308/36.1, 36.4, 187.1, 308/187.2, 202, 207 R, 217

[56] References Cited

U.S. PATENT DOCUMENTS

| | | | |
|---|---|---|---|
| 628,479 | 7/1899 | Lawson | 308/202 X |
| 991,862 | 5/1911 | Lockwood | 308/207 R |
| 1,145,516 | 7/1915 | Schmid-Roost | 308/36.4 X |
| 1,405,313 | 1/1922 | Minney | 308/36.4 |
| 1,872,814 | 8/1932 | Riblet | 308/207 R X |
| 2,598,381 | 5/1952 | Hoffman | 308/36.4 X |
| 3,053,588 | 9/1962 | Abel | 308/36.4 X |
| 3,382,016 | 5/1968 | Schmidt | 308/207 R |

*Primary Examiner*—James E. Bryant, III
*Attorney, Agent, or Firm*—Wyatt, Gerber, Shoup, Scobey & Badie

[57] ABSTRACT

A roller bearing having a forcible lubrication function comprises an outer race provided with a radial rib directed inwardly. The bearing has a cage provided with a circular ring portion situated axially outwardly of the rib of the outer race to overlap the rib with a desired clearance to provide forced circulation of lubricant about the bearing.

2 Claims, 2 Drawing Figures

ROLLER BEARING HAVING A FORCIBLE LUBRICATION FUNCTION

BACKGROUND OF THE INVENTION

Field of the Invention

This invention relates to the lubrication of a bearing such as a needle roller bearing, a long cylindrical roller bearing or a cylindrical roller bearing which is provided with a cage.

SUMMARY OF THE INVENTION

It is the object of the present invention to provide a roller bearing having a forcible lubrication function. The bearing has an outer race with a rib and a cage provided at one or, perhaps, both ends with a radial circular ring portion(s) situated axially outwardly of the rib(s) of the outer race and radially overlapping said rib(s) with a suitable clearance(s) interposed dimensioned to allow the flow of oil, whereby lubricating oil in the bearing may be forcibly discharged outwardly by said circular ring portion while, at the same time, lubricating oil around the bearing may be drawn into the bearing to thereby provide good lubrication of the bearing, and the discharge of heat and dust or other foreign material are carried out effectively.

The invention will become fully apparent from the following detailed description thereof taken in conjunction with the accompanying drawings.

DESCRIPTION OF THE PREFERRED EMBODIMENTS

Figure 1:
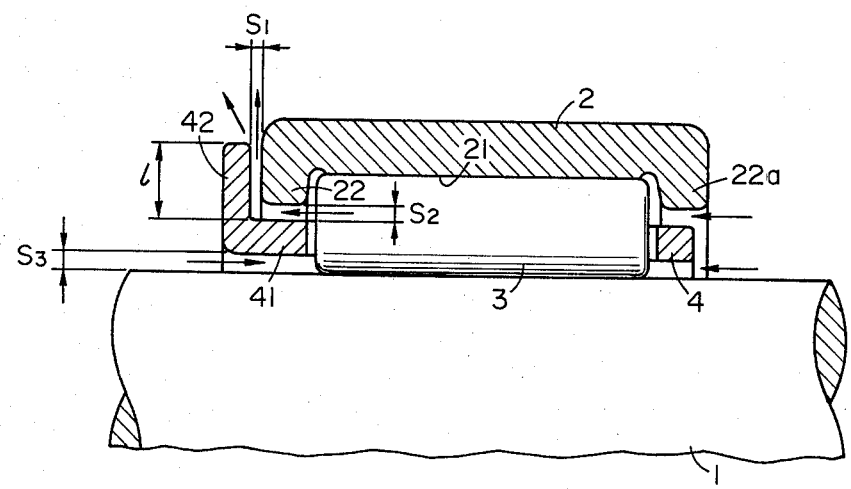
FIG. 1 is a longitudinal cross-sectional view showing the essential portions of a first embodiment of a bearing according to the present invention.

The present invention will herein after be described with respect to two representative embodiments shown in FIGS. 1 and 2. Reference numeral 1 designates a shaft, reference numeral 2 denotes the outer race (which may be solid-shaped or shell-shaped) of a roller bearing which rotatably supports the shaft 1, reference numeral 3 designates a roller (only one of the rollers is shown), and reference numeral 4 denotes a cage. The outer race 2 is formed with radially ribs 22, 22a directed inwardly at the opposite ends of an inner track 21.

First, in a first embodiment shown in FIG. 1, the cage 4 is formed with a circular ring portion 42 situated axially outwardly of the outer race and extending radially outwardly of the outer race. The ring portion 42 extends from one end of a cylindrical portion 41 having windows for holding and guiding the respective rollers. The circular ring portion 42 of the cage opposed to the rib 22 of the outer race has a suitable width l over which the circular ring portion radially overlaps the rib 22, and is opposed to the rib 22 with a suitable clearance S1 interposed between the circular ring portion and the outer side surface of the rib. Also, clearances S2 and S3 dimensioned so as not to restrain the rotation of the cage and to allow the flow of lubricating oil during the rotation of the bearing, are formed between the outer peripheral surface of said cylindrical portion 41, which is the main body of the cage, and the inner peripheral surface of the rib 22 and between the inner peripheral surface of the cylindrical portion 41 and the outer peripheral surface of the shaft 1, respectively.

Figure 2:
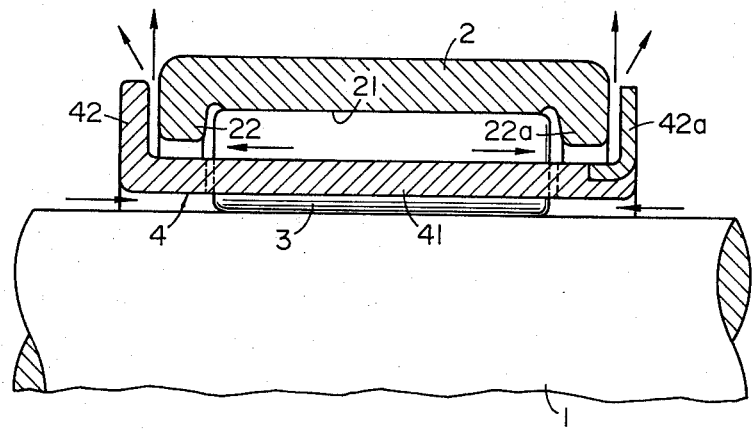
FIG. 2 is a longitudinal cross-sectional view showing the essential portions of a second embodiment of a bearing according to the present invention.

FIG. 2 shows a second embodiment of the present invention. In this embodiment, circular ring portions 42, 42a of the cage are formed at the opposite ends of the main body 41 and the respective relation of the circular ring portions 42, 42a to the ribs 22, 22a is the same as that in the first embodiment.

Particularly in this embodiment, with the machinability of the circular ring portions 42, 42a and the assemblage thereof to the outer race being taken into account, circular ring portion 42a is formed by integrally coupling a doughnut-shaped member formed separate from the cylindrical portion 41 of the cage to the cylindrical portion. This one circular ring portion 42a need not always be formed by a separate member but both of the circular ring portions may sometimes be formed unitarily with the cylindrical portion.

As described above, the roller bearing of the present invention is of a construction which has, at least one end of the cage, a circular ring portion extending radially outwardly and opposed to the outer side surface of the rib of the outer race with a desired clearance interposed therebetween, and therefore, where the bearing is used in a case containing lubricating oil therein, the lubricating oil around the bearing is circulated and supplied to the bearing. That is, the circular ring portions 42, 42a of the cage 4 acts as a slinger by the rotation of the cage 4 and, by the centrifugal force thereof, the lubricating oil is flung outwardly through the clearance S1 between the circular ring portions 42, 42a and the ribs 22, 22a of the outer race, and the lubricating oil within the bearing is drawn out through the clearance S2 between the outer peripheral surface of the cylindrical portion 41 of the cage 4 and the inner peripheral surface of the rib 22 of the outer race. Therefore, lubricating oil within the bearing is drawn into the interior of the bearing through the clearance S3 between the inner peripheral surface of the cylindrical portion 41 of the cage and the outer peripheral surface of the shaft 1. By such action being performed, forcible lubrication of the interior and exterior of the bearing by the lubricating oil is effected.

Accordingly, it becomes possible that foreign material such as abrasion powder within the bearing is discharged outwardly and fresh lubricating oil is supplied to the interior of the bearing, and also heat generated the bearing is removed by to said circulation of the lubricating oil, thus prolonging the service life of the bearing.

Of course, the means for forming the circular ring portions of the cage is not restricted to the illustrated embodiments, but it may be suitably modified in practice in accordance with the shape, material, thickness and size of the cage. Particularly, where the cage is made of plastics, it can be injection-molded and thus various modifications or treatments may be applied to the cage. For example, it becomes easier to provide, on the peripheral surface of the circular ring portion or the main body portion, a groove for ensuring more effective discharge and inflow of the lubricating oil. Also, the circular ring portion may be continuous or discontinuous circumferentially thereof.

I claim:

1. A bearing assembly for a rotating element, including an outer race having a rib extending radially inwards from an end portion thereof, a plurality of rollers held within said race for rotational movement about the rotating element, a cage engaging said rollers for movement therewith, and means for forcibly circulating lubricant through the bearing assembly, said means including a first clearance formed between the outer surface of said cage and the inner surface of said race, a second clearance formed between the inner surface of said cage and the outer surface of the rotating element, and a ring portion carried by said cage and extending axially outward from said rib with a third clearance therebetween, said clearances being sufficient to cause lubricant to be extracted from the bearing assembly through said first and third clearances by the centrifugal forces applied to the lubricant by the rotation of said rotating element and to be drawn into the bearing assembly through said second clearance.

2. A bearing assembly for a rotating element, including an outer race having respective ribs extending radially inwards from each end portion thereof, a plurality of rollers held within said race for rotational movement about the rotating element, a cage engaging said rollers for movement therewith, and means for forcibly circulating lubricant through the bearing assembly, said means including first clearances formed between the outer surface of said cage and the inner surface of said race, second clearances formed between the inner surface of said cage and the outer surface of the rotating element, and a respective ring portion carried at each end of said cage and extending axially outward from a respective rib with third clearances therebetween, said clearances being sufficient to cause lubricant to be extracted from the bearing assembly through said first and third clearances by the centrifugal forces applied to the lubricant by the rotation of said rotating element and to be drawn into the bearing assembly through said second clearances.

* * * * *